(12) United States Patent  
Glickman

(10) Patent No.: US 10,466,118 B1
(45) Date of Patent: Nov. 5, 2019

(54) STRETCHABLE FLEXIBLE DURABLE PRESSURE SENSOR

(71) Applicant: Multek Technologies Limited, San Jose, CA (US)

(72) Inventor: Michael James Glickman, Mountain View, CA (US)

(73) Assignee: Multek Technologies, Ltd., San Jose, CA (US)

( * ) Notice: Subject to any disclaimer, the term of this patent is extended or adjusted under 35 U.S.C. 154(b) by 0 days.

(21) Appl. No.: 15/249,024

(22) Filed: Aug. 26, 2016

Related U.S. Application Data

(60) Provisional application No. 62/211,566, filed on Aug. 28, 2015.

(51) Int. Cl.
*G01L 1/14* (2006.01)

(52) U.S. Cl.
CPC .................... *G01L 1/146* (2013.01)

(58) Field of Classification Search
CPC ........... G01L 1/22; G01L 1/146; H05K 1/028; G01B 7/16
USPC .................................... 73/862.626
See application file for complete search history.

(56) References Cited

U.S. PATENT DOCUMENTS

| | | | |
|---|---|---|---|
| 3,830,991 A | 8/1974 | Durocher | |
| 4,017,697 A | 4/1977 | Larson | |
| 4,492,949 A * | 1/1985 | Peterson | B25J 13/084 338/114 |
| 4,774,530 A | 9/1988 | Hawkins | |
| 5,291,374 A | 3/1994 | Hirata | |
| 5,626,135 A | 5/1997 | Sanfilippo | |
| 5,739,254 A | 4/1998 | Fuller | |
| 5,761,809 A | 6/1998 | Fuller | |
| 5,762,812 A | 6/1998 | Narang | |
| 5,849,809 A | 12/1998 | Narang | |
| 5,863,963 A | 1/1999 | Narang | |
| 5,945,253 A | 8/1999 | Narang | |
| 5,958,995 A | 9/1999 | Narang | |
| 5,994,425 A | 11/1999 | Narang | |
| 6,007,877 A | 12/1999 | Narang | |
| 6,124,372 A | 9/2000 | Smith | |
| 6,139,920 A | 10/2000 | Smith | |

(Continued)

OTHER PUBLICATIONS

Notice of Allowance dated Feb. 26, 2018, U.S. Appl. No. 14/995,139, filed Jan. 13, 2016, applicant: Pui Yin Yu, 9 pages.

(Continued)

*Primary Examiner* — Octavia Hollington
(74) *Attorney, Agent, or Firm* — Haverstock & Owens LLP

(57) ABSTRACT

A stretchable flexible pressure sensor includes stretchable conductive interconnects, or electrodes, sandwiching an elastic substrate that is stretchable in one or more directions. The interconnects are positioned on opposing surfaces of the elastic substrate and overlap at select sensing areas. The elastic substrate at each sensing area is replaced with a foam or air gap to enable movement of a top stretchable conductive interconnect, a bottom stretchable conductive interconnect or both toward each other in response to an applied force. The stretchable conductive interconnects are each patterned having a meandering shape and are aligned with each other. The meandering shape provides slack such that as the elastic substrate is stretched the slack is taken up.

20 Claims, 3 Drawing Sheets

(56) References Cited

U.S. PATENT DOCUMENTS

| | | | |
|---|---|---|---|
| 6,260,956 B1 | 7/2001 | Narang | |
| 6,302,523 B1 | 10/2001 | Smith | |
| 6,388,556 B1 | 5/2002 | Imai | |
| 6,483,055 B1 | 11/2002 | Tanabe | |
| 6,534,723 B1 | 3/2003 | Asai | |
| 6,964,205 B2* | 11/2005 | Papakostas | G01L 1/20 73/862.046 |
| 7,112,755 B2 | 9/2006 | Kitano | |
| 7,456,571 B1 | 11/2008 | Wedding | |
| 7,528,337 B2 | 5/2009 | Tanabe | |
| 7,578,195 B2* | 8/2009 | DeAngelis | G01L 1/146 324/687 |
| 8,207,473 B2* | 6/2012 | Axisa | B32B 37/185 174/254 |
| 8,883,287 B2* | 11/2014 | Boyce | B29C 59/02 174/254 |
| 9,247,648 B2* | 1/2016 | Vanfleteren | H01L 21/565 |
| 9,340,003 B2 | 5/2016 | Chang | |
| 9,418,927 B2* | 8/2016 | Axisa | H01L 23/49838 |
| 9,538,641 B2* | 1/2017 | Markus | H05K 1/028 |
| 9,699,893 B2* | 7/2017 | Matsumoto | H05K 1/028 |
| 9,706,647 B2* | 7/2017 | Hsu | H05K 1/0283 |
| 9,730,330 B1* | 8/2017 | Boyle | H05K 1/189 |
| 2002/0018042 A1 | 2/2002 | Albert | |
| 2003/0227079 A1 | 12/2003 | Chia | |
| 2004/0256725 A1 | 12/2004 | Inoue | |
| 2004/0262036 A1 | 12/2004 | Brist | |
| 2006/0072944 A1 | 4/2006 | Sharma | |
| 2006/0131158 A1 | 6/2006 | Takiguchi | |
| 2007/0096260 A1 | 5/2007 | Eshun | |
| 2008/0018611 A1* | 1/2008 | Serban | G06F 3/0416 345/173 |
| 2008/0139953 A1 | 6/2008 | Baker | |
| 2009/0102580 A1 | 4/2009 | Uchaykin | |
| 2009/0108270 A1 | 4/2009 | Chen | |
| 2009/0257166 A1 | 10/2009 | Kim | |
| 2009/0272197 A1* | 11/2009 | Ridao Granado | G01L 1/20 73/828 |
| 2010/0014265 A1 | 1/2010 | Sagisaka | |
| 2010/0160762 A1 | 1/2010 | McLaughlin | |
| 2010/0063365 A1 | 3/2010 | Pisani | |
| 2010/0107770 A1* | 5/2010 | Serban | G01L 1/142 73/718 |
| 2010/0185076 A1 | 7/2010 | Jeong | |
| 2011/0067904 A1 | 3/2011 | Aoyama | |
| 2011/0114376 A1 | 5/2011 | Shoji | |
| 2011/0180306 A1 | 7/2011 | Naganuma | |
| 2011/0180307 A1 | 7/2011 | Naganuma | |
| 2011/0194262 A1 | 8/2011 | Naganuma | |
| 2011/0198111 A1 | 8/2011 | Naganuma | |
| 2011/0199739 A1 | 8/2011 | Naganuma | |
| 2011/0203837 A1 | 8/2011 | Naganuma | |
| 2012/0052268 A1 | 3/2012 | Axisa | |
| 2013/0019383 A1 | 1/2013 | Korkala | |
| 2013/0038545 A1 | 2/2013 | Hsu | |
| 2013/0060115 A1 | 3/2013 | Gehman | |
| 2013/0220535 A1 | 8/2013 | Lee | |
| 2014/0015633 A1 | 1/2014 | Nakae | |
| 2014/0124245 A1 | 5/2014 | Lai | |
| 2014/0190727 A1 | 7/2014 | Lee | |
| 2014/0343390 A1 | 11/2014 | Berzowska | |
| 2015/0187863 A1 | 7/2015 | Zhu | |
| 2015/0261057 A1 | 9/2015 | Harris | |
| 2015/0366504 A1 | 12/2015 | Connor | |
| 2016/0007468 A1 | 1/2016 | Tomikawa | |
| 2016/0132150 A1* | 5/2016 | Cotton | G06F 3/044 345/174 |
| 2016/0183372 A1 | 6/2016 | Park | |
| 2016/0290880 A1* | 10/2016 | Lewis | G01L 1/2287 |
| 2017/0108459 A1 | 4/2017 | Katsuki | |
| 2017/0150602 A1 | 5/2017 | Johnston | |
| 2017/0172421 A1 | 6/2017 | Dabby | |
| 2017/0358841 A1 | 12/2017 | Chen | |
| 2018/0020563 A1 | 1/2018 | Hong | |
| 2018/0070446 A1 | 3/2018 | Takahashi | |

OTHER PUBLICATIONS

Non-Final Office Action dated May 17, 2018, U.S. Appl. No. 14/724,673, filed May 28, 2015, Applicant: Weifeng Liu, 19 pages.

\* cited by examiner

STRETCHABLE FLEXIBLE DURABLE PRESSURE SENSOR

RELATED APPLICATIONS

This Patent Application claims priority under 35 U.S.C. 119 (e) of the U.S. Provisional Application, Ser. No. 62/211,566, filed Aug. 28, 2015, and entitled "Stretchable Flexible Durable Pressure Sensor". This application incorporates U.S. Provisional Application, Ser. No. 62/211,566 in its entirety by reference.

FIELD OF THE INVENTION

The present invention is generally directed to pressure sensors. More specifically, the present invention is directed to a stretchable flexible pressure sensor.

BACKGROUND OF THE INVENTION

A pressure sensor is a device for measuring the applied pressure at an area occupied by the sensor, where pressure is the force applied perpendicular to the surface of the sensor per unit area over which that force is distributed. A pressure sensor typically functions as a transducer in that a signal is generated as a function of the pressure applied. The generated signal is typically an electrical signal. Conventional pressure sensors include a pad for sensing applied pressure and straight wires attached to the pad. Such a configurations does not enable stretchability.

SUMMARY OF THE INVENTION

Embodiments of a stretchable flexible pressure sensor are directed to stretchable conductive interconnects, or electrodes, sandwiching an elastic substrate that is stretchable in one or more directions. The stretchable conductive interconnects are positioned on opposing surfaces of the elastic substrate and overlap at select sensing areas. In some embodiments, the elastic substrate at each sensing area is replaced with a foam or air gap to enable movement of a top stretchable conductive interconnect, a bottom stretchable conductive interconnect or both toward each other in response to an applied force. The stretchable conductive interconnects are each patterned having a meandering shape. The shape of the stretchable conductive interconnects within each sensing area is such that when the elastic substrate is in a relaxed, or non-stretched, state each stretchable conductive interconnect forms a meandering path, such as a serpentine waveform, along the substrate surface. The meandering shape of the stretchable conductive interconnects provides slack such that as the elastic substrate is stretched the slack is taken up. Once released, the elastic substrate returns from the stretched position to the relaxed, non-stretched position, and slack is reintroduced into the stretchable conductive interconnects in the form of the original meandering shape. In this manner, the stretchable conductive interconnects that form the stretchable flexible pressure sensor are able to be stretched when a stretching force is applied and return back to the non-stretched state when the stretching force is removed.

In an aspect, a stretchable flexible pressure sensor is disclosed. The stretchable flexible pressure sensor includes an elastic substrate, a first stretchable conductive interconnect and a second stretchable conductive interconnect. The elastic substrate comprises a material that enables the elastic substrate to be stretched in one or more directions. The elastic substrate comprises a first surface and an opposing second surface and a gap extending through the elastic substrate. The first stretchable conductive interconnect is coupled to the first surface of the elastic substrate. At least a portion of the first stretchable conductive interconnect has a meandering shape aligned with the gap in the elastic substrate. The second stretchable conductive interconnect is coupled to the second surface of the elastic substrate. At least a portion of the second stretchable conductive interconnect has the meandering shape and is aligned with the gap in the elastic substrate. The meandering shapes of each of the first stretchable conductive interconnect and the second stretchable conductive interconnect are aligned to form a pressure sensor. In some embodiments, the gap in the elastic substrate is an air gap. In some embodiments, the gap in the elastic substrate is filled with a compressible material. In some embodiments, the compressible material is a foam. In some embodiments, the first and second stretchable conductive interconnects are formed as a conductive ink printed onto the elastic substrate. In some embodiments, the first and second stretchable conductive interconnects are deposited onto the elastic substrate and etched to form the meandering shape. In some embodiments, the first and second stretchable conductive interconnects are metal wires attached to the elastic substrate. In some embodiments, the stretchable flexible pressure sensor further comprises a first insulating layer positioned on the first surface of the elastic substrate and over the gap, wherein the first insulating layer is positioned between the first stretchable conductive interconnect and the gap, and further comprising a second insulating layer positioned on the second surface of the elastic substrate and over the gap, wherein the second insulating layer is positioned between the second stretchable conductive interconnect and the gap. In some embodiments, a shape of the gap is the meandering shape, and the first stretchable conductive interconnect, the second stretchable conductive interconnect and the gap are co-aligned. In some embodiments, the elastic substrate is configured to be stretched along at least a first direction when a stretching force is applied along the first direction, and the meandering path of the first and second stretchable conductive interconnects is meandering relative to at least the first direction so as to enable stretching of the first and second stretchable conductive interconnects along at least the first direction upon application of the stretching force. In some embodiments, the elastic substrate comprises one or more of an elastomer, silicone, urethane, latex and elastane.

In another aspect, a stretchable flexible pressure sensor array is disclosed. The stretchable flexible pressure sensor array includes an elastic substrate, a plurality of first stretchable conductive interconnects and a plurality of second stretchable conductive interconnects. The elastic substrate comprises a material that enables the elastic substrate to be stretched in one or more directions. The elastic substrate comprises a first surface and an opposing second surface and a plurality of gaps extending through the elastic substrate. The plurality of first stretchable conductive interconnects are coupled to the first surface of the elastic substrate. Each first stretchable conductive interconnect forms a row in the stretchable flexible pressure sensor array. Multiple portions of each first stretchable conductive interconnect have a meandering shape aligned with one of the plurality of the gaps in the elastic substrate. The plurality of second stretchable conductive interconnects coupled to the second surface of the elastic substrate. Each second stretchable conductive interconnect forms a column in the stretchable flexible pressure sensor array. Multiple portions of each second stretchable conductive interconnect have the meandering shape and is aligned with one of the plurality of the gaps in the elastic substrate. The meandering shape of one portion of each of the first stretchable conductive interconnect is aligned with a corresponding one portion of the second stretchable conductive interconnects to form a pressure sensor.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a stretchable flexible pressure sensor. Those of ordinary skill in the art will realize that the following detailed description of the stretchable flexible pressure sensor is illustrative only and is not intended to be in any way limiting. Other embodiments of the stretchable flexible pressure sensor will readily suggest themselves to such skilled persons having the benefit of this disclosure.

Reference will now be made in detail to implementations of the stretchable flexible pressure sensor as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
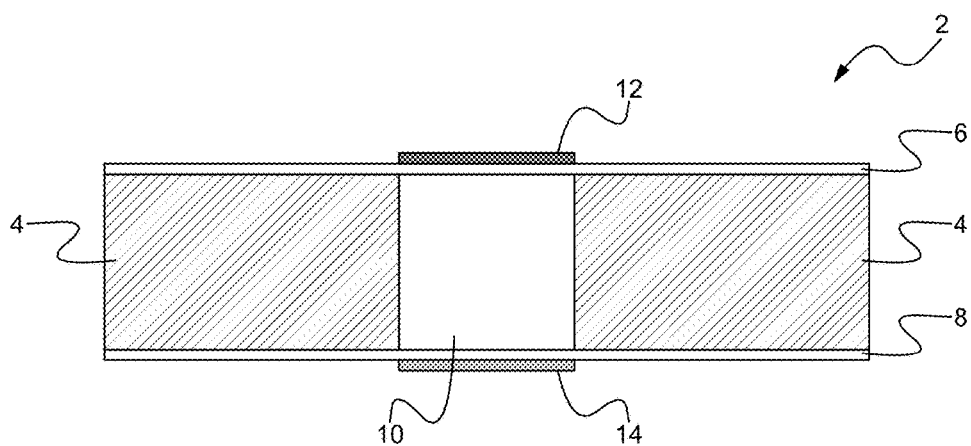
FIG. 1 illustrates a cross-sectional view of a stretchable flexible pressure sensor at an overlapping portion of conductive interconnects according to some embodiments.

FIG. 1 illustrates a cross-sectional view of a stretchable flexible pressure sensor at an overlapping portion of conductive interconnects according to some embodiments. The stretchable flexible pressure sensor 2 includes an elastic substrate 4 having a portion removed. The area at the removed portion of the substrate 2 forms a sensor or capacitive gap 10. In some embodiments, the removed portion is replaced by a compressible foam. In other embodiments, the removed portion remains void of material and forms an air gap. The elastic substrate 4 is made of a flexible and elastic material that is stretchable in one or more directions. In some embodiments, the elastic substrate 4 is an elastic polymer, or elastomer, which is a polymer with viscoelasticity. It is understood that alternative elastic substrates can be used including, but not limited to, silicone, urethane, latex and spandex, also referred to as elastane. Less stretchable materials can also be used including, but not limited to polyimide, TPU (thermoplastic polyurethane), PET (polyethylene terephthalate) and PEN (polyethylene naphthalate).

A first insulating layer 6 is positioned on a first surface of the elastic substrate 4 and extends over the sensor or capacitive gap 10. In some embodiments, the insulating layer is made of any type of polymer insulator. A second insulating layer 8 is positioned on a second surface of the elastic substrate 4. The second insulating layer 8 extends over the sensor or capacitive gap 10.

A first stretchable conductive interconnect 12 is selectively positioned on the first insulating layer 6, and a second stretchable conductive interconnect 14 is selectively positioned on the second insulating layer 8. Although not evident from the cross-sectional view shown in FIG. 1, the first stretchable conductive interconnect 12 and the second stretchable conductive interconnect 14 have meandering shapes, as shown in more detail in the exemplary embodiment of FIG. 2. At least a portion of the first stretchable conductive interconnect 12 overlaps the sensor or capacitive gap 10, and at least a portion of the second stretchable conductive interconnect 14 overlaps the sensor or capacitive gap 10. The portions of the first and second stretchable conductive interconnects 12, 14 overlapping the sensor or capacitive gap 10 are aligned with each other. The overlapping portions of the first and second stretchable conductive interconnects 12, 14 and the sensor or capacitive gap 10 forms a pressure sensor. Each stretchable conductive interconnect can be made from a variety of conductive materials in a variety of forms including, but not limited to, etched copper metal, printed stretchable inks, stainless steel/copper wire and conductive yarns. It is understood that other conductive materials can used including, but not limited to, gold, silver, copper, nickel, their alloys, their combinations and any other electrically conductive material.

The capacitance between the first stretchable conductive interconnect 12 and the second stretchable conductive interconnect 14 changes if the distance between the two changes, such as by applied pressure to one or both of the stretchable conductive interconnects. The stretchable flexible pressure sensor measures the voltage across each of the first and second conductive interconnects 12, 14 and therefore measures the capacitance between the two. Applied pressure is calculated using a change in capacitance between the two stretchable conductive interconnects 12, 14. In some embodiments, a force sensitive resistor (FSR) is positioned in the gap. The FSR can be connected to both the first and second conductive interconnects 12, 14, or the FSR can be connected to two electrodes on one side only.

Figure 2:
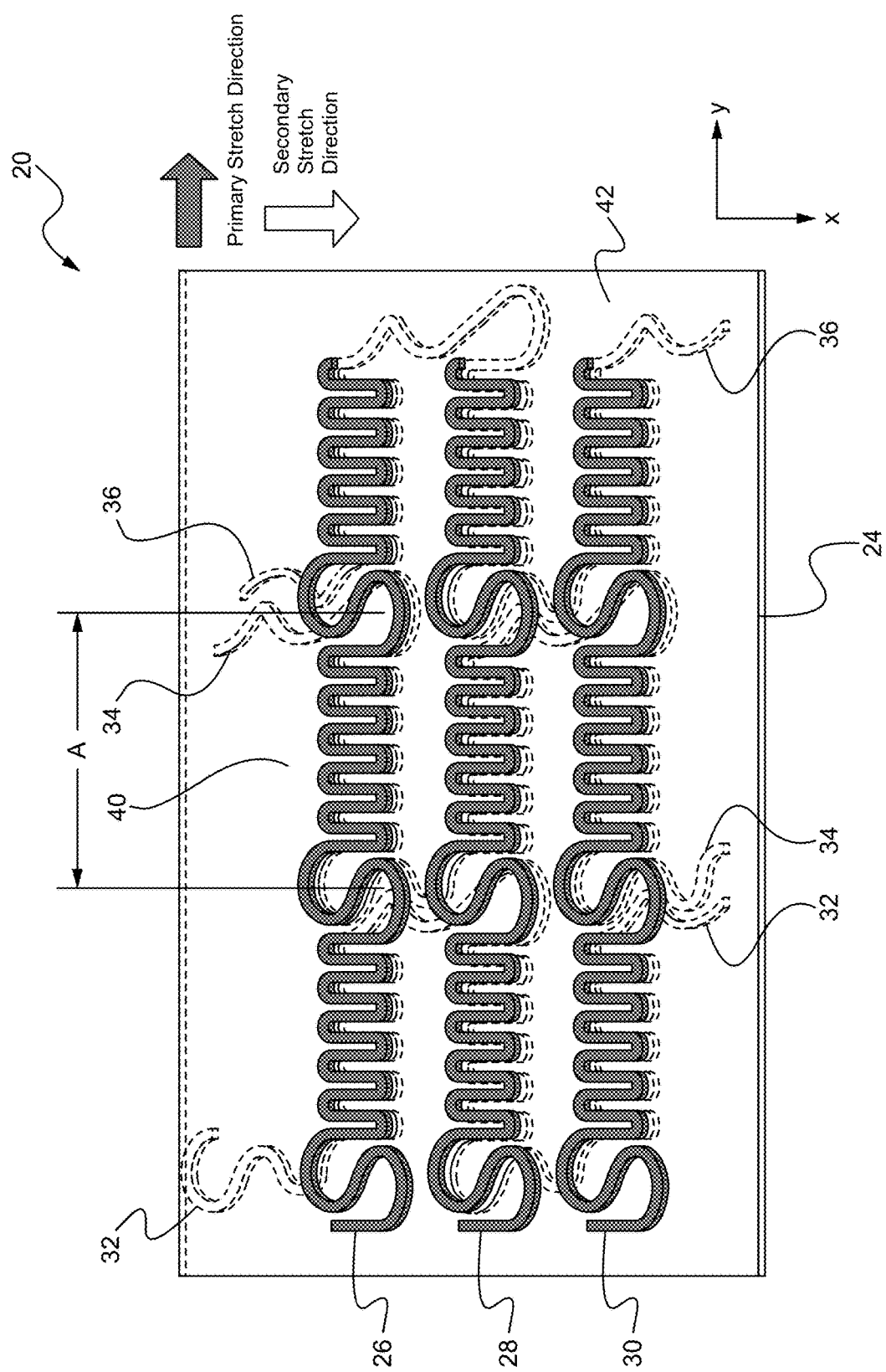
FIG. 2 illustrates a top down perspective view of a stretchable flexible pressure sensor array according to some embodiments.
Figure 3:
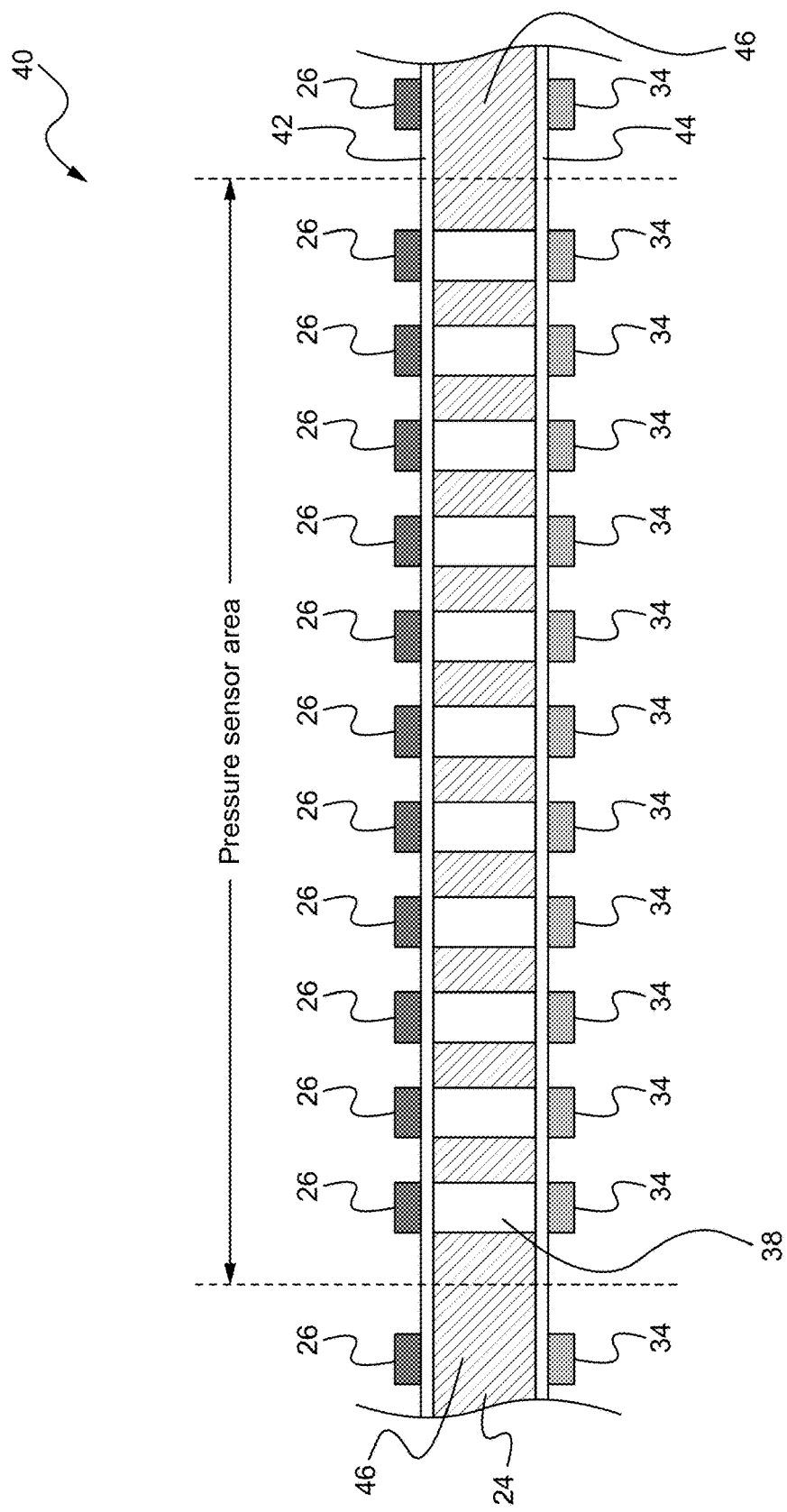
FIG. 3 illustrates a cross-sectional view of the individual pressure sensor 40 at line A-A in FIG. 2.

FIG. 2 illustrates a top down perspective view of a stretchable flexible pressure sensor array according to some embodiments. The stretchable flexible pressure sensor 20 applies the concepts and structure of the stretchable flexible pressure sensor 2 of FIG. 1. The stretchable flexible pressure sensor 20 has a plurality of individual pressure sensors areas. The stretchable flexible pressure sensor array 20 includes an elastic substrate 24 having a portion removed at each individual pressure sensor area. The area at each removed portion of the substrate 24 forms a sensor or capacitive gap 38 (FIG. 3). In some embodiments, the removed portion is replaced by a compressible foam. In other embodiments, the removed portion remains void of material and forms an air gap. The elastic substrate 24 is made of a flexible and elastic material that is stretchable in one or more directions. In some embodiments, the elastic substrate 24 is an elastic polymer, or elastomer, which is a polymer with viscoelasticity. It is understood that alternative elastic substrates can be used including, but not limited to, silicone, urethane, latex and spandex, also referred to as elastane. Less stretchable materials can also be used including, but not limited to polyimide, TPU (thermoplastic polyurethane), PET (polyethylene terephthalate) and PEN (polyethylene naphthalate).

A first insulating layer 42 is positioned on a first surface of the elastic substrate 24 and extends over each sensor or capacitive gap. A second insulating layer 44 (FIG. 3) is positioned on a second surface of the elastic substrate 24. The second sealing layer extends over each sensor or capacitive gap.

First stretchable conductive interconnects 26, 28, 30 are selectively positioned on the first insulating layer 42, and second stretchable conductive interconnects 32, 34, 36 are selectively positioned on the second insulating layer. FIG. 2 shows the first insulating layer 42, the elastic substrate 24 and the second insulating layer in see-through so as to show the second stretchable conductive interconnects 32, 34, 36 on the underside of the stretchable flexible pressure sensor 20. The first stretchable conductive interconnects 26, 28, 30 are not connected to each other and are therefore electrically isolated from each other. Similarly, the second stretchable conductive interconnects 32, 34, 36 are not connected to each other and are therefore electrically isolated from each other. The first stretchable conductive interconnect 26 forms a first row of the pressure sensor array, the first stretchable conductive interconnect 28 forms a second row of the pressure sensor array, and the first stretchable conductive interconnect 30 forms a third row of the pressure sensor array. The second stretchable conductive interconnect 32 forms a first column of the pressure sensor array. The second stretchable conductive interconnect 34 forms a second column of the pressure sensor array. The second stretchable conductive interconnect 36 forms a third column of the pressure sensor array. The first stretchable conductive interconnects 26, 28, 30 and the second stretchable conductive interconnects 32, 34, 36 each have meandering shapes. The meandering shapes of the stretchable conductive interconnects are configured such that a portion of each row is aligned with a portion of each column to form an individual pressure sensor, such as individual pressure sensor 40 corresponding to the overlap of the first row and the second column. For example, the meandering shape of the second stretchable conductive interconnect 32 is formed such that a first portion of the second stretchable conductive interconnect 32 is aligned with a first portion of the first stretchable conductive interconnect 26, a second portion of the second stretchable conductive interconnect 32 is aligned with a first portion of the first stretchable conductive interconnect 28, and a third portion of the second stretchable conductive interconnect 32 is aligned with a first portion of the first stretchable conductive interconnect 30. The second stretchable conductive interconnect 34 is similarly configured to align with second portions of the first stretchable interconnects 26, 28, 30, and the second stretchable conductive interconnect 36 is similarly configured to align with third portions of the first stretchable interconnects 26, 28, 30.

Within each individual pressure sensor, at least a portion of the first stretchable conductive interconnect 26, 28 or 30 overlaps the sensor or capacitive gap 38, and at least a portion of the second stretchable conductive interconnect 32, 34 or 36 overlaps the sensor or capacitive gap 38. The portions of the first stretchable conductive interconnects 26, 28 or 30 and the second stretchable conductive interconnects 32, 34 or 36 overlapping the sensor or capacitive gap 38 are aligned with each other. The overlapping portions of the first stretchable conductive interconnects 26, 28 or 30 and the second stretchable conductive interconnects 32, 34 or 36 and the sensor or capacitive gap 38 forms the individual pressure sensor.

FIG. 3 illustrates a cross-sectional view of the individual pressure sensor 40 at line A-A in FIG. 2. The individual pressure sensor 40 corresponds to the overlapping of the second portion of the first stretchable conductive interconnect 26 and the first portion of the second stretchable conductive interconnect 34. The sensor or capacitive gap 38 is formed in the elastic substrate 24. In the exemplary configuration shown in FIG. 3, the sensor or capacitive gap 38 is formed to have a matching meandering shape as the second portion of the first stretchable conductive interconnect 26 and the first portion of the second stretchable conductive interconnect 34. Alternatively, the elastic substrate 24 aligned with the second portion of the first stretchable conductive interconnect 26 and the first portion of the second stretchable conductive interconnect 34 is removed as well as select additional portions of the elastic substrate 24 to form one a sensor or capacitive gap that does not necessarily match the meandering shape of the stretchable conductive interconnects. Still alternatively, all of the elastic substrate 24 aligned with the second portion of the first stretchable conductive interconnect 26 and the first portion of the second stretchable conductive interconnect 34 is removed to form one large sensor or capacitive gap. Still alternatively, the sensor or capacitive gap is narrower than a width of the stretchable conductive interconnect. As also shown in FIG. 3, the elastic substrate 24 is still present at those areas 46 aligned with the first stretchable conductive interconnect 26 and the second stretchable conductive interconnect 34 but in transitional areas between individual pressure sensors, such as at each larger shaped "S" of first stretchable conductive interconnect 26 in FIG. 2. The configuration of the stretchable conductive interconnects in the transitional areas is designed such that the transitional areas stretch farther than the individual pressure sensor areas, thereby absorbing more of the stretching force applied to the stretchable flexible pressure sensor array.

As shown in FIG. 2, the stretchable flexible pressure sensor array 20 is in a relaxed, or non-stretched, state. In the non-stretched state, the stretchable conductive interconnects 26, 28, 30 and the stretchable conductive interconnects 32, 34, 36 each form a meandering path relative to a stretchable direction of the elastic substrate 24, in this case the elastic substrate 24 is stretchable in both the x-direction and the y-direction. In this manner, slack in the stretchable conductive interconnects 26, 28, 30, 32, 34, 36 is introduced relative to the direction of motion when the stretchable flexible pressure sensor array 20 is stretched. In some embodiments, the elastic substrate 24 is an elastic polymer, or elastomer, which is a polymer with viscoelasticity. It is understood that alternative elastic substrates can be used including, but not limited to, silicone, urethane, latex and spandex, also referred to as elastane. Less stretchable materials can also be used including, but not limited to polyimide, TPU (thermoplastic polyurethane), PET (polyethylene terephthalate) and PEN (polyethylene naphthalate).

In the non-stretched state, the elastic substrate 24 has a non-stretched length and a non-stretched width. The elastic substrate 24 can be stretched in the x-direction until a maximum stretched position where the conductive interconnects in each row form a straight line. In the maximum stretched position, the elastic substrate 24 has a stretched length and a stretched width, where the stretched length is greater than the non-stretched length, and the stretched width is less than the non-stretched width. In practice, the stretchable flexible pressure sensor is designed to have a maximum stretchable length that is less than the distance corresponding to the conductive interconnects forming a straight line. In this case, the maximum stretchable length is a function of the maximum stretchable length of the elastic substrate or some other limiting factor. Such a configuration minimizes metal fatigue by minimizing extreme bending back and forth of the conductive interconnects that comes with stretching and releasing of the elastic substrate.

In the example configuration shown in FIG. 2, the stretchable conductive interconnects are formed to enable stretchability predominantly in the x-direction. It is understood that the stretchable conductive interconnects can also be formed to accommodate greater degree of stretching in the y-direction and/or the z-direction, where the z-direction is into and out of the page in relation to FIG. 2. The amount by which the elastic substrate 24, and therefore the stretchable conductive interconnects can be stretched in any direction is a function of the slack provided relative to that specific direction. In the case of y-direction stretching as applied to the exemplary stretchable conductive interconnect waveform shown in FIG. 2, each stretchable conductive interconnect does not straighten toward a single straight line as with stretching in the x-direction. Instead, stretching in the y-direction compresses the each stretchable conductive interconnect along the x-direction, moving the peaks and valleys of the meal wire waveform toward each other in the x-direction. It is understood that simultaneous stretching in multiple directions results in reducing the maximum stretchable limit in any one direction.

In the exemplary configuration shown in FIG. 2, the stretchable conductive interconnects have serpentine-like waveforms. In alternative embodiments, the stretchable conductive interconnects can be configured to have other waveforms or patterns that form a meandering path.

The exemplary stretchable flexible pressure sensor array shown in FIG. 2 includes a 3×3 array of stretchable flexible sensors. It is understood that larger or smaller arrays, both symmetric and asymmetric are also contemplated. Arrays configured alternatively than rows and columns is also contemplated. Individual stretchable flexible pressure sensors are also contemplated where a single stretchable flexible pressure sensor is individually wired in isolation.

In some embodiments, the stretchable conductive interconnects are formed as a conductive ink printed onto the non-stretched elastic substrate, such as by inkjet printers or screen printing. The conductive ink is printed in any desired pattern that forms a meandering path. In other embodiments, the stretchable conductive interconnects are deposited and etched, such as using photolithography, to form the meandering path. In still other embodiments, the stretchable conductive interconnects are metal wires attached to the surface of the elastic substrate.

The present application has been described in terms of specific embodiments incorporating details to facilitate the understanding of the principles of construction and operation of the stretchable flexible pressure sensor. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A stretchable flexible pressure sensor comprising:
   a. an elastic substrate comprising a material that enables the elastic substrate to be stretched in one or more directions, wherein the elastic substrate comprises a first surface and an opposing second surface and a gap extending through the elastic substrate;
   b. a first stretchable conductive interconnect coupled to the first surface of the elastic substrate, wherein at least a portion of the first stretchable conductive interconnect has a meandering shape aligned with the gap in the elastic substrate; and
   c. a second stretchable conductive interconnect coupled to the second surface of the elastic substrate, wherein at least a portion of the second stretchable conductive interconnect has the meandering shape and is aligned with the gap in the elastic substrate, and the meandering shapes of each of the first stretchable conductive interconnect and the second stretchable conductive interconnect are aligned to form a pressure sensor, wherein a shape of the gap is the meandering shape, and the first stretchable conductive interconnect, the second stretchable conductive interconnect, and the gap are co-aligned.

2. The stretchable flexible pressure sensor of claim 1 wherein the gap in the elastic substrate is an air gap.

3. The stretchable flexible pressure sensor of claim 1 wherein the gap in the elastic substrate is filled with a compressible material.

4. The stretchable flexible pressure sensor of claim 3 wherein the compressible material is a foam.

5. The stretchable flexible pressure sensor of claim 1 wherein the first and second stretchable conductive interconnects are formed as a conductive ink printed onto the elastic substrate.

6. The stretchable flexible pressure sensor of claim 1 wherein the first and second stretchable conductive interconnects are deposited onto the elastic substrate and etched to form the meandering shape.

7. The stretchable flexible pressure sensor of claim 1 wherein the first and second stretchable conductive interconnects are metal wires attached to the elastic substrate.

8. The stretchable flexible pressure sensor of claim 1 further comprising a first insulating layer positioned on the first surface of the elastic substrate and over the gap, wherein the first insulating layer is positioned between the first stretchable conductive interconnect and the gap, and further comprising a second insulating layer positioned on the second surface of the elastic substrate and over the gap, wherein the second insulating layer is positioned between the second stretchable conductive interconnect and the gap.

9. The stretchable flexible pressure sensor of claim 1 wherein the elastic substrate is configured to be stretched along at least a first direction when a stretching force is applied along the first direction, and the meandering path of the first and second stretchable conductive interconnects is meandering relative to at least the first direction so as to enable stretching of the first and second stretchable conductive interconnects along at least the first direction upon application of the stretching force.

10. The stretchable flexible pressure sensor of claim 1 wherein the elastic substrate comprises one or more of an elastomer, silicone, urethane, latex and elastane.

11. A stretchable flexible pressure sensor array comprising:
   a. an elastic substrate comprising a material that enables the elastic substrate to be stretched in one or more directions, wherein the elastic substrate comprises a first surface and an opposing second surface and a plurality of gaps extending through the elastic substrate;
   b. a plurality of first stretchable conductive interconnects coupled to the first surface of the elastic substrate, each first stretchable conductive interconnect forms a row in the stretchable flexible pressure sensor array, wherein multiple portions of each first stretchable conductive interconnect have a meandering shape aligned with one of the plurality of the gaps in the elastic substrate; and
   c. a plurality of second stretchable conductive interconnects coupled to the second surface of the elastic substrate, each second stretchable conductive interconnect forms a column in the stretchable flexible pressure sensor array, wherein multiple portions of each second stretchable conductive interconnect have the meandering shape and is aligned with one of the plurality of the gaps in the elastic substrate, and the meandering shape of one portion of each of the first stretchable conductive interconnect is aligned with a corresponding one portion of the second stretchable conductive interconnects to form a pressure sensor, wherein a shape of each of the plurality of gaps is the meandering shape, and one portion of the first stretchable conductive interconnects, one portion of the second stretchable conductive interconnects and one of the plurality of gaps are co-aligned.

12. The stretchable flexible pressure sensor of claim 11 wherein each gap in the elastic substrate is an air gap.

13. The stretchable flexible pressure sensor of claim 11 wherein each gap in the elastic substrate is filled with a compressible material.

14. The stretchable flexible pressure sensor of claim 13 wherein the compressible material is a foam.

15. The stretchable flexible pressure sensor of claim 13 wherein the plurality of first stretchable conductive interconnects and the plurality of second stretchable conductive interconnects are formed as a conductive ink printed onto the elastic substrate.

16. The stretchable flexible pressure sensor of claim 13 wherein the plurality of first stretchable conductive interconnects and the plurality of second stretchable conductive interconnects are deposited onto the elastic substrate and etched to form the meandering shape.

17. The stretchable flexible pressure sensor of claim 13 wherein the plurality of first stretchable conductive interconnects and the plurality of second stretchable conductive interconnects are metal wires attached to the elastic substrate.

18. The stretchable flexible pressure sensor of claim 13 further comprising a first insulating layer positioned on the first surface of the elastic substrate and over the plurality of gaps, wherein the first insulating layer is positioned between the plurality of first stretchable conductive interconnects and the plurality of gaps, and further comprising a second insulating layer positioned on the second surface of the elastic substrate and over the plurality of gaps, wherein the second insulating layer is positioned between the plurality of second stretchable conductive interconnects and the plurality of gaps.

19. The stretchable flexible pressure sensor of claim 13 wherein the elastic substrate is configured to be stretched along at least a first direction when a stretching force is applied along the first direction, and the meandering path of the plurality of first stretchable conductive interconnects and the plurality of second stretchable conductive interconnects is meandering relative to at least the first direction so as to enable stretching of the plurality of first stretchable conductive interconnects and the plurality of second stretchable conductive interconnects along at least the first direction upon application of the stretching force.

20. The stretchable flexible pressure sensor of claim 13 wherein the elastic substrate comprises one or more of an elastomer, silicone, urethane, latex and elastane.

* * * * *